April 2, 1963
W. C. MILLS
3,084,150
PREPARATION AND RECOVERY OF OLEFIN POLYMERS
Filed Nov. 18, 1957
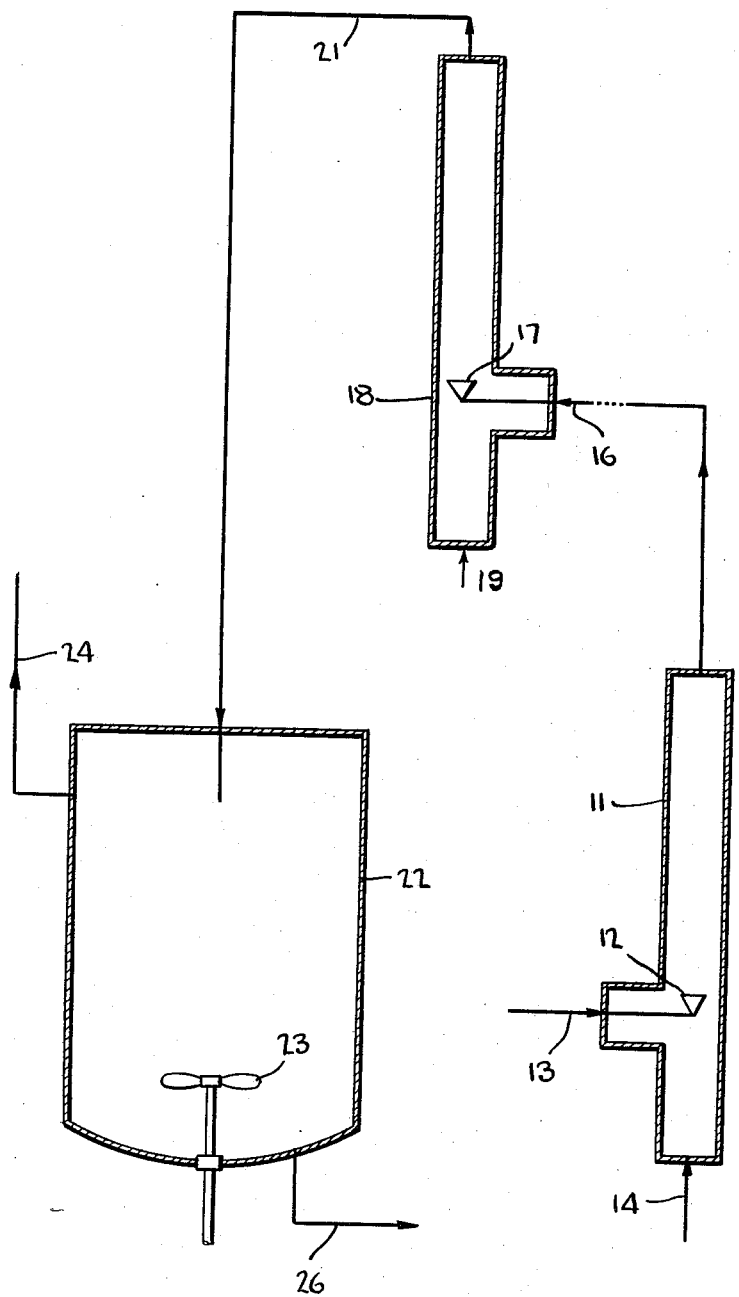

United States Patent Office 3,084,150
Patented Apr. 2, 1963

3,084,150
PREPARATION AND RECOVERY OF
OLEFIN POLYMERS
William C. Mills, Pasadena, Tex., assignor to Celanese Corporation of America, New York, N.Y., a corporation of Delaware
Filed Nov. 18, 1957, Ser. No. 697,190
6 Claims. (Cl. 260—94.9)

This invention relates to the production of olefin polymers.

High polymers of 1-mono olefins, and particularly highly crystalline, high density polymers of ethylene and of monoalkylethylenes, have been produced by polymerization in the presence of a solvent, such as cyclohexane, and a chromium oxide catalyst, as shown for example in Belgian Patent No. 530,617 of January 24, 1955. It has, however, been difficult to isolate the polymers in the desirable form of particles of high bulk density.

It is therefore an object of this invention to provide a novel and economical method for the recovery of a high polymer of an olefin from a solution thereof.

Other objects of this invention will be apparent from the following detailed description and claims. In this description and claims all proportions are by weight unless otherwise indicated.

In the practice of one aspect of this invention a stream of hot solution of the ethylene polymer and a stream of cooler water are fed continuously to a mixing T of conventional type comprising a confined zone, through which the water flows, and a nozzle for spraying the solution into the flowing stream of water. The polymer precipitates in the stream of water and the resulting mixture flows turbulently through the confined zone under a pressure sufficient to maintain the solvent and the water in the liquid phase. The residence time of the mixture under this pressure is at least five seconds. When lower residence times are employed the bulk density of the precipitated polymer is relatively low and the precipitated polymer may occlude considerable amounts of water and solvent; also the product tend to be fibrous. In contrast, the products produced in accordance with this invention generally have a bulk density of at least 16, e.g. 20 to 24 pounds per cubic foot or more and are in the form of rough pellets, usually about 1/16 to 1/8 inch in diameter.

Preferably, the concentration of ethylene polymer in the solution fed to the mixing T is in the range of 2 to 4.5%, e.g. about 3 to 4%, and the ratio of water to solution is in the range of 2 to 5:1 and the temperature of the mixture formed in the T is in the range of about 110 to 130° F. Generally the temperature of the solution is in the range of about 270 to 310° F. and the temperature of the added water is about 90 to 105° F.

To recover the precipitated polymer from the water and solvent it is convenient to feed the stream of the mixture under pressure to a second mixing T, where the mixture is injected into a stream of water, having a higher temperature than the water fed to the first mixing T. The ratio of total water fed (to both T's) to polymer solution is preferably about 5 to 9:1 and the temperature of the mixture formed in the second T is preferably in the range of about 130 to 145° F. This mixture then flows, under a pressure sufficient to maintain the solvent and the water in the liquid phase, to a stripping zone where the pressure is reduced so that the solvent evaporates off. The polymer particles may then be removed from the water easily, as by screening.

The accompanying drawing is a diagrammatic illustration of the apparatus used in the process of this invention. In the drawing numeral 11 designates a mixing T containing a spray nozzle 12 (such as a Binks F92–97 Rotojet hollow cone spray nozzle) disposed in the straight run of the T. A polymer solution is supplied under pressure, through line 13 passing through the leg of the T 11, to the nozzle 12. A stream of water is supplied under a lower superatmospheric pressure, to the straight run of the T through a line 14, and the resulting mixture of polymer, solvent and water is fed under pressure through a pipe 16, of sufficient length to provide the desired residence time, to a spray nozzle 17 (preferably a Binks F120–121 Rotojet hollow cone spray nozzle) of a second mixing T 18 where it meets a second stream of water fed, under a still lower superatmospheric pressure, from a line 19. The resulting mixture flows, under superatmospheric pressure, from the second mixing T 18 through a pipe 21 and into a stripping tank 22 where the pressure is low enough to permit evaporation of solvent. In the tank 22 the mixture is agitated by a stirrer 23 and the solvent vapors are discharged for subsequent recovery, through an outlet 24, while the resulting slurry of polymer is withdrawn continuously through a lower outlet 26.

The polymer solution treated in accordance with this invention is advantageously obtained by a process which involves continuously polymerizing ethylene in solution in the presence of a catalyst, flashing off unreacted ethylene from the resulting mixture, removing catalyst particles as by filtration or centrifuging, and, if desired, diluting with a further quantity of solvent. The preferred type of catalyst is a chromium oxide catalyst having a chromium content within the range of about 2 to 3% (the balance being substantially silica and alumina although other catalyst supports, such as thoria, zirconia, and composites of these oxides, may be employed) and a particle size in the range of about 0.1 to 150 microns, at least a portion of the chromium being in the hexavalent form. The polymerization reaction is preferably carried out in liquid phase in a heated polymerization zone under superatmospheric pressure (e.g. a pressure in the range of about 100 to 800 p.s.i.a. preferably 300 to 500 p.s.i.a., in the presence of excess ethylene, using a mixture containing about 84 to 87% of solvent, about 12 to 15% ethylene and about 0.03 to 0.1% of catalyst. The polymerization temperature is ordinarily in the range of about 140° to 470° F. preferably about 275 to 290° F. A stream of solution containing the suspended catalyst in the proportions indicated above may be withdrawn continuously from the polymerization zone. This stream may be fed to a flashing zone to remove unreacted ethylene and may be diluted with the same solvent to a polymer concentration of about 3 to 5%, before feeding it to a catalyst removal zone.

The polyethylene should be maintained in solution during the catalyst removal step. To this end it is desirable to maintain the mixture at a temperature, preferably above 265° F., e.g. 265 to 310° F., which is above the temperature at which the polymer precipitates or solidifies in the solvent. Since these temperatures are above the boiling point of the preferred solvent the solution should be maintained under superatmospheric pressure, of magnitude above the vapor pressure of the solution at these temperatures. For this purpose, it is convenient to inject an inert gas, such as nitrogen, at the desired superatmospheric pressure, into the free space in the equipment, e.g. the centrifuges or filters, used for catalyst removal.

The polyethylene resin produced by the process of this invention are highly crystalline (crystallinity above 90% as determined by the method of Nielsen, Journal of Applied Physics, volume 25, pages 1210 and 1211, October 1954), and have high densities, above 0.955.

The following example is given to illustrate this invention further.

*Example*

A mixture produced by the polymerization of ethylene in cyclohexane in the presence of a suspended catalyst comprising chromium oxide supported on silica and alumina (2.3% chromium on a base of silica-alumina in which the silica: alumina ratio is 6.4:1), the particle size of the catalyst being 0.1–150 microns. The polymerization temperature is 286° F., the pressure is 420 p.s.i.a. and the ratio of ethylene:cyclohexane:catalyst in the feed is 240:1760:1. Unreacted ethylene is flashed off from the mixture and the mixture is diluted with cyclohexane until the mixture contains 0.04% catalyst with 5.6% polyethylene. The mixture is then diluted with cyclohexane and centrifuged for removal of catalyst, to produce a solution containing 3.5% polyethylene, with solution is fed continuously at a temperature of 290° F. and under a pressure of 190 p.s.i.a. to a first mixing T where it is sprayed at the rate of 3.8 gallons per minute through a hollow cone spray nozzle (Binks F92–97) into a stream of water flowing through the 2 inch internal diameter straight run of the T, the water being supplied at a pressure of 80 p.s.i.a. and a temperature of 100° F., and the volumetric ratio of water to polymer solution feed at this point being 3:1. The resulting mixture, whose temperature is 120° F., flows for a distance of 21 inches in the T, then passes through a 1 inch internal diameter pipe 12 feet long and enters the hollow cone spray nozzle (Binks F120–121) of a second mixing T where it is sprayed into a stream of water flowing through the 2 inch internal diameter straight run of the second T. The water is supplied to the second T at a temperature of 140° F. and a pressure of 20 p.s.i.a. at a volumetric rate 3 times the rate at which the polymer solution is supplied to the first T, and the resulting mixture, which is at a temperature of 135° F. and a pressure of 20 p.s.i.a., flows through a 1 inch internal diameter pipe 12 feet long to stripping tank, maintained at atmospheric pressure and a temperature of 174° F., where the solvent evaporates. The residence time of the mixture between the first nozzle and the second nozzle is 5.2 seconds; between the second nozzle and the point where the pressure is reduced to atmospheric the residence time is 2.5 seconds. The polyethylene particles thus produced have, after drying at a temperature of 240° F., a bulk density of 20 pounds per cubic foot; they are porous particles about $\frac{1}{16}$ to $\frac{1}{8}$ inch in diameter.

It is to be understood that the foregoing detailed description is given merely by way of illustration and that many variations may be made therein without departing from the spirit of my invention.

Having described my invention, what I desire to secure by Letters Patent is:

1. Process for the recovery of a solid polymer of a 1-monoolefin of the group consisting of ethylene and monoalkylethylenes from a solution thereof in a volatile solvent therefor, which comprises continuously spraying said solution into a confined stream of water and passing the resulting mixture at superatmospheric pressure sufficient to maintain the solvent and water in the liquid phase in a stream through a confined zone to produce a precipitate of solid polymer in a mixture of solvent and water, the residence time of said mixture in said confined zone being at least 5 seconds, and thereafter separating said polymer precipitate from said solvent and water to produce porous particles of polyolefin having, when dried, a bulk density of at least 16 pounds per cubic foot.

2. Process for the recovery of a solid highly crystalline high density polymer of ethylene from a solution thereof in cyclohexane, which comprises continuously spraying said solution into a confined stream of water and passing the resulting mixture at superatmosperic pressure sufficient to maintain the cyclohexane and water in the liquid phase in a stream through a confined zone to produce a precipitate of solid polymer in a mixture of solvent and water, the residence time of said mixture in said confined zone being at least 5 seconds, and thereafter separating said polymer precipitate from said solvent and water to produce porous particles of polyolefin having, when dried, a bulk density of at least 16 pounds per cubic foot.

3. Process as set forth in claim 2 in which said solution is at a temperature in the range of about 270 to 310° F. and the amount and temperature of the water is such that said resulting mixture has a temperature of about 110 to 130° F.

4. Process as set forth in claim 3 in which the concentration of polymer in said solution is about 2 to 4.5% and the volumetric ratio of water to polymer solution is about 2:1 to 5:1.

5. Process for the production of high density highly crystalline polymer of ethylene which comprises polymerizing ethylene in solution in cyclohexane in the presence of particles of catalyst comprising chromium oxide, at least partly in hexavalent form, supported on silica-alumina, at a pressure of about 300 to 500 pounds per square inch absolute and a temperature of about 275 to 290° F., the ethylene content of said solution being about 12 to 15%, and the chromium content of said catalyst being about 2 to 3%, producing a solution of a high density highly crystalline polymer of ethylene in said solvent containing suspended catalyst, removing catalyst from said solution and spraying the resulting solution containing about 2 to 4.5% polymer, at a temperature of about 270 to 310° F., into a confined stream of cooler water, passing the resulting mixture comprising precipitated polyethylene in cyclohexane and water at superatmospheric pressure sufficient to maintain the cyclohexane and water in the liquid phase in a stream through a confined zone, the residence time of said mixture in said confined zone being at least 5 seconds, the temperature of the mixture in said confined zone being about 110 to 130° F. and the ratio of water to polymer solution being about 2:1 to 5:1, passing the resulting mixture into a heated zone at a pressure sufficiently low to cause said cyclohexane to evaporate and thereafter removing water from said precipitated polyethylene to produce porous particles of polyethylene having, when dried, a bulk density of at least 20 pounds per cubic foot.

6. Process for the recovery of a solid highly crystalline high density polymer of ethylene from a solution thereof in cyclohexane, which comprises continuously spraying said solution into a confined stream of water and passing the resulting mixture at superatmospheric pressure sufficient to maintain the cyclohexane and water in the liquid phase in a stream through a confined zone, to produce a precipitate of solid polymer in a mixture of solvent and water the residence time of said mixture in said confined zone being at least 5 seconds, thereafter spraying said resulting mixture into a further stream of water, which is at a higher temperature than said first-named stream, in a confined zone maintained at superatmospheric pressure sufficient to maintain the cyclohexane and water in the liquid phase and the mixture thus obtained is introduced into a heated zone at a pressure sufficiently low to cause said cyclohexane to evaporate and thereafter separating said polymer precipitate from said solvent and water to produce porous particles of polyolefin having, when dried, a bulk density of at least 16 pounds per cubic foot.

References Cited in the file of this patent

UNITED STATES PATENTS

| | | |
|---|---|---|
| 2,256,483 | Johnston | Sept. 23, 1941 |
| 2,726,234 | Field et al. | Dec. 6, 1955 |
| 2,728,753 | Russum et al. | Dec. 27, 1955 |
| 2,825,721 | Hogan et al. | Mar. 4, 1958 |
| 2,927,904 | Cooper | Mar. 8, 1960 |
| 2,957,855 | McLeod | Oct. 25, 1960 |
| 2,964,516 | Henderson | Dec. 15, 1960 |

FOREIGN PATENTS

| | | |
|---|---|---|
| 530,617 | Belgium | Jan. 24, 1955 |